(12) United States Patent
Di Crescenzo

(10) Patent No.: US 9,032,202 B2
(45) Date of Patent: May 12, 2015

(54) PRIVACY-PRESERVING PUBLISH-SUBSCRIBE PROTOCOL IN A CLOUD-ASSISTED MODEL

(71) Applicant: TT Government Solutions, Inc., Basking Ridge, NJ (US)

(72) Inventor: Giovanni Di Crescenzo, Madison, NJ (US)

(73) Assignee: Vencore Labs, Inc., Basking Ridge, NJ (US)

( * ) Notice: Subject to any disclaimer, the term of this patent is extended or adjusted under 35 U.S.C. 154(b) by 0 days.

(21) Appl. No.: 13/775,912

(22) Filed: Feb. 25, 2013

(65) Prior Publication Data

US 2013/0227274 A1 Aug. 29, 2013

Related U.S. Application Data

(60) Provisional application No. 61/602,260, filed on Feb. 23, 2012.

(51) Int. Cl.
*H04L 29/06* (2006.01)
*G06F 21/60* (2013.01)

(52) U.S. Cl.
CPC ............ *H04L 63/045* (2013.01); *G06F 21/602* (2013.01); *H04L 63/062* (2013.01)

(58) Field of Classification Search
CPC ............................ H04L 63/062; H04L 63/045
USPC ........................................................ 713/153
See application file for complete search history.

(56) References Cited

U.S. PATENT DOCUMENTS

| | | | | |
|---|---|---|---|---|
| 5,812,667 A | * | 9/1998 | Miki et al. ................. | 380/249 |
| 6,947,556 B1 | * | 9/2005 | Matyas et al. ............. | 380/29 |
| 8,027,923 B2 | * | 9/2011 | Liu ............................ | 705/51 |
| 8,401,185 B1 | * | 3/2013 | Telang ...................... | 380/44 |
| 8,463,871 B1 | * | 6/2013 | Tormasov ................. | 709/219 |
| 2002/0170053 A1 | * | 11/2002 | Peterka et al. ............ | 725/31 |
| 2003/0236993 A1 | * | 12/2003 | McCreight et al. ...... | 713/200 |
| 2004/0054722 A1 | * | 3/2004 | DeFloor et al. .......... | 709/203 |
| 2005/0204139 A1 | * | 9/2005 | Helland et al. ........... | 713/171 |
| 2007/0106754 A1 | * | 5/2007 | Moore ....................... | 709/217 |
| 2008/0065878 A1 | * | 3/2008 | Hutson et al. ............ | 713/153 |
| 2008/0107272 A1 | * | 5/2008 | Carmeli et al. .......... | 380/278 |

(Continued)

OTHER PUBLICATIONS

Yuen, "Toward a Cryptographic Treatment of Publish/Subscribe Systems", 2014, Journal of Computer Security, p. 33-67.*

*Primary Examiner* — Mohammad L Rahman
*Assistant Examiner* — Gregory Lane
(74) *Attorney, Agent, or Firm* — Heslin Rothenberg Farley & Mesiti P.C.

(57) ABSTRACT

A server receives from a client at least one interest pseudonym produced by a double application of a pseudo random function to at least one interest of the client. The server encrypts an item. The server computes at least one intermediate topic pseudonym for at least one topic associated with the item by applying the function to each of the at least one topic associated with the item. The server transmits the at least one intermediate topic pseudonym, the at least one interest pseudonym, and the encrypted item to a third party. The third party may apply the function to the at least one intermediate topic pseudonym to produce at least one topic pseudonym associated with the item and transmit the encrypted item to the client for decryption when one of the at least one masked topic pseudonym is equal to one of the at least one interest pseudonym of the client.

23 Claims, 6 Drawing Sheets

(56) References Cited

U.S. PATENT DOCUMENTS

| | | | |
|---|---|---|---|
| 2008/0248819 A1* | 10/2008 | Smith et al. ................. | 455/466 |
| 2010/0094937 A1* | 4/2010 | Chalouhi et al. ............. | 709/204 |
| 2010/0100845 A1* | 4/2010 | Khan et al. ................... | 715/810 |
| 2010/0125584 A1* | 5/2010 | Navas ........................... | 707/747 |
| 2011/0179020 A1* | 7/2011 | Ozzie et al. ................... | 707/723 |
| 2011/0264917 A1* | 10/2011 | Barthelemy et al. .......... | 713/176 |
| 2013/0013921 A1* | 1/2013 | Bhathena et al. ............. | 713/168 |
| 2013/0013922 A1* | 1/2013 | Kerschbaum .................. | 713/168 |

* cited by examiner

PRIVACY-PRESERVING PUBLISH-SUBSCRIBE PROTOCOL IN A CLOUD-ASSISTED MODEL

CROSS-REFERENCE TO RELATED APPLICATIONS

This application claims the benefit of U.S. provisional patent application No. 61/602,260 filed Feb. 23, 2012, the disclosure of which is incorporated herein by reference in its entirety.

STATEMENT REGARDING FEDERALLY SPONSORED RESEARCH OR DEVELOPMENT

The disclosed invention was made with government support under contract No. D12PC00520, legacy: D11PC20197 awarded by Intelligence Advanced Research Projects Activity of the Office of the Director of National Intelligence. The government has certain rights in the present invention.

FIELD OF THE INVENTION

The present invention relates to publish-subscribe protocols. More particularly, the present invention relates to a method and system for providing privacy in a publish-subscribe protocol.

BACKGROUND OF THE INVENTION

Publish-subscribe protocols have been employed for the distribution of streaming data. A common publish-subscribe protocol is an RSS (Rich Site Summary) feed. An RSS feed is a family of web feed formats used to publish frequently updated works in a standardized format. The data transmitted in an RSS feed may include blog entries, news headlines, audio, and video. RSS feeds or documents include full or summarized text, plus metadata such as publishing dates and authorship. RSS feeds can be read using software called an "RSS reader", "feed reader", or "aggregator", which can be web-based, desktop-based, or mobile-device-based. The user subscribes to a feed by entering into the reader a URI of the feed or by clicking a feed icon in a web browser that initiates the subscription process. The RSS reader checks the user's subscribed feeds regularly for new work, downloads any updates that it finds, and provides a user interface to monitor and read the feeds.

A user can subscribe to a topic, such as finance, and receive in an email daily or monthly or weekly messages only in finance. The user receives RSS feeds only in areas (associated with the topic) to which they subscribe. The user does not receive of all documents that are published by one particular publisher.

An RSS feed is a specific instance of the more general class of publish-subscribe protocols which employ a publish-subscribe architectural pattern. Publish-subscribe is a messaging pattern where senders of messages, called publishers, do not program the messages to be sent directly to specific receivers, called subscribers. Instead, published messages are characterized into classes, without knowledge of what, if any, subscribers there may be. Similarly, subscribers express interest in one or more classes, and only receive messages that are of interest, without knowledge of what, if any, publishers there are.

More particularly, in a publish-subscribe architecture, a subscriber can specify interests-cats, dogs, the stock market, finance, education, etc. A publisher may periodically publish items (e.g. documents) that may include attached tags, known as topics. These topics are included in a dictionary of topics. The dictionary is shared with subscribers. The subscribers may find their interests in the dictionary. A dictionary is a collection of all topics that each item may or may not relate to, and is known to all participants (e.g., subscribers and publishers). Interests are elements from the dictionary associated with a subscriber. Topics are elements from the dictionary associated with an item. Items may be digital documents in any format. If one of the interests of the subscriber is determined by the publisher to be equal to one of the topics of the next item to be published by the server, then the subscriber receives the item once it is published by the publisher. If no interests match any topics in the dictionary of the publisher, then the subscriber does not receive the item to be published.

A problem often encountered in circumstance where publish-subscribe protocols are employed is privacy violations—e.g., privacy with respect to transmitted data and/or the interests and/or identity of the subscribers. In the examples below, the clients are not malicious and clouding but are considered honest but curious.

For example, in a typical RSS feed, a subscriber reveals their interests, e.g., finance, and the publisher may view the interests; thus, the publisher may obtain some information about the personal choices of the subscriber. As a result, the privacy of the subscriber may be violated. Other instances of violations of privacy are more sensitive. For example, from the government's perspective, there may be sensitive databases that reveal sensitive material and topics, e.g., an agency may publish documents. One agency is interested in a certain document; another agency may be interested in another document. In certain circumstances, without privacy protections in place, an intruder in one agency may determine the interests of another agency. In another example, one or more subscribers is interested in the Facebook stock. As a result, a publisher or an external intruder may learn that a number of subscribers are suddenly interested in Facebook stock. Thus, privacy is an important issue with respect to transmission of documents employing publish-subscribe protocols.

Currently deployed publish-subscribe methods and systems target a very limited set of security or privacy requirements (if at all). For example, centralized architectures generally employ a server that is trusted and that further protects against outsiders and client misbehavior through authentication and transport layer security (e.g., SSL/TLS. See Tim Dierks, Eric Rescorla, "The Transport Layer Security (TLS) Protocol Version 1.2.," Internet Engineering Task Force, Request for Comments 5246, August 2008). Similarly, distributed implementations commonly operate in the "fortress model" in which participants are trusted and outsiders are not trusted (See Yair Amir, Cristina Nita-Rotaru, Jonathan Stanton, Gene Tsudik, "Secure Spread: An Integrated Architecture for Secure Group Communication," IEEE Transactions on Dependable and Secure Computing (TDSC), 2(3): 248-261, (2005)).

The work of Castro and Liskov (See Miguel Castro and Barbara Liskov, "Practical Byzantine Fault Tolerance and Proactive Recovery," ACM Trans, Comput. Syst., 20(4): 398-461 (2002)) even as extended to achieve perform well when under attack as described in Yair Amir, Brian Coan, Jonathan Kirsch, John Lane, "Byzantine Replication Under Aattack," In Proc. of the 38th IEEE International Conference on Dependable Systems and Networks (DSN08), 2008: 197-206 and in Allen Clement, Edmund Wong, Lorenzo Alvisi, Mike Dahlin, Mirco Marchetti, "Making Byzantine Fault Tolerant Systems Tolerate Byzantine Faults," In Proc. of the 6th USENIX Symposium on Networked Systems Design and Implementation, 2009: 153-168, provide functionality in the presence of compromised components, but do not attempt to provide client privacy. A well-studied area in cryptography research, known as Secure Multi-Party Computation (or Secure Function Evaluation (see Andrew Chi-Chih Yao, "Theory and Applications of Trapdoor Functions (Extended Abstract)," In Proc. of IEEE FOCS 1982: 80-91 and Oded Goldreich, Silvio Micali, Avi Wigderson, "How to Play any Mental Game or A Completeness Theorem for Protocols with Honest Majority," In Proc. of ACM STOC 1987: 218-229) address the general problem of two or more parties, each with its own input, jointly and privately computing a function over the inputs. This general approach provides more capability than is needed to implement private publish-subscribe, and is thus too expensive. Basic and well-studied problems in cryptography research, addressing secure computation of specific functions, include Private Information Retrieval (where a client is interested in obtaining one out of a server's many strings without revealing which one) (see Benny Chor, Eyal Kushilevitz, Oded Goldreich, Madhu Sudan, "Private Information Retrieval," In J. ACM 45(6): 965-981 (1998) and Eyal Kushilevitz, Rafail Ostrovsky, "Replication is NOT Needed: SINGLE Database, Computationally-Private Information Retrieval," In Proc. of IEEE FOCS 1997: 364-373), Oblivious Transfer (here, the server transfers the client's desired string without knowing which one or revealing all other ones (see Michael O. Rabin, "How to Exchange Secrets with Oblivious Transfer," Technical Report TR-81, Aiken Computation Lab, Harvard University, 1981), Private Set Intersection (see, e.g., Michael J. Freedman, Kobbi Nissim, Benny Pinkas, "Efficient Private Matching and Set Intersection," In Proc. of EUROCRYPT 2004: 1-19 (in this method, two parties hold a set of values and at the end of the protocol one of them can compute the intersection of the two sets), and Conditional Oblivious Transfer in Giovanni Di Crescenzo, Rafail Ostrovsky, Sivaramakrishnan Rajagopalan, "Conditional Oblivious Transfer and Timed-Release Encryption," In Proc. of EUROCRYPT 1999: 74-89 (a variant of oblivious transfer such that a message is sent from a sender to a receiver if and only if a predicate over the two parties' inputs is true, and the sender does not know the predicate value).

Other security and cryptography research has directly considered the problem of designing secure and/or private publish-subscribe protocols. This research has fallen short as having either a different participant model (i.e., they typically consider publishers as active participants or entirely distributed models with no servers or third parties), having a different set of capabilities and functionalities (i.e., they typically ignore protocol dynamics like subscription updates or only target sophisticated filtering rules for content publication), or having a different set of security and/or privacy requirements (i.e., they often require privacy against intermediate routing nodes or privacy only against the server, or they target more demanding requirements which ultimately result in not efficient protocols).

The work described in Costin Raiciu, David S. Rosenblum, "Enabling Confidentiality in Content-Based Publish/Subscribe Infrastructures," In Proc. of SecureComm 2006: 1-11 (based on ideas on searchable encryption from Dawn Song, David Wagner, and Adrian Perrig, "Practical Techniques for Searches on Encrypted Data," In Proc. of the IEEE Symposium on Security and Privacy, 2000), provides a very efficient publish-subscribe protocol in a restricted participant model (a 1-server, 1-client model), but which only supports privacy against a server and not against clients and does not support subscription updates by clients and related privacy requirements.

Accordingly, what would be desirable, but has not yet been provided, is a system and method for providing security and privacy guarantees in a publish-subscribe protocol in the presence of honest-but-curious participants.

SUMMARY OF THE INVENTION

The above-described problems are addressed and a technical solution is achieved in the art by providing a method for providing security and privacy guarantees in a publish-subscribe protocol in the presence of honest-but-curious participants. In an embodiment, the server may receive the item with associated topics. In an embodiment, a server receives from a client at least one interest pseudonym produced by the application of a function using a server key to at least one interest of the client to produce at least one intermediate interest pseudonym and the application the function using a third party key to the at least one intermediate interest pseudonym to produce the at least one interest pseudonym. The server encrypts an item. The server computes at least one intermediate topic pseudonym for at least one topic associated with the item by applying the function using the server key to each of the at least one topic associated with the item. The server transmits the at least one intermediate topic pseudonym, the at least one interest pseudonym, and the encrypted item to a third party.

In an embodiment, the third party applies the function using the third party key to the at least one intermediate topic pseudonym to produce at least one topic pseudonym associated with the item. The third party determines whether one of the at least one topic pseudonym is equal to one of the at least one interest pseudonym. The third party transmits the encrypted item to the client when one of the at least one topic pseudonym is equal to one of the at least one interest pseudonym of the client; otherwise, the encrypted item is not transmitted to the client. The client may then decrypt the item after having received from the server a decrypting key.

In an embodiment, the server key and decryption key are shared by client and the server, but not by the third party. In an embodiment, the server key, the third party key, and the decryption key may differ from each other. The server key, the third party key, and the decryption key may be symmetric keys.

In an embodiment, the server may receive from the client an indication to add the at least one interest pseudonym to at least one subscription of the client. The server may receive from the client an indication to delete the at least one interest pseudonym from at least one subscription of the client. If an item is to be deleted, the server may disassociate the at least one interest pseudonym with the at least one subscription of the client. For deleting an interest pseudonym, the server may receive from the client an interest pseudonym for at least one other interest of the client that is not to be deleted when receiving the indication from the client to delete the at least one interest pseudonym from the at least one subscription of the client. The interest pseudonym for at least one other interest of the client may differ from an initial interest pseudonym for the at least one other interest received by the server from the client.

In an embodiment, the function may be a pseudo-random function. The pseudo-random function may be implemented using a block cipher or a keyed cryptographic hash function.

In an embodiment, the server may employ a point-to-point secure communication protocol with the client and the third party.

In an embodiment, the applying, encrypting and transmitting may be performed for each of a plurality of clients requesting a pull when the server is in a pull mode. In an embodiment, the applying, encrypting and transmitting may be performed for each of a plurality of clients when the server is in a push mode.

BRIEF DESCRIPTION OF THE DRAWINGS

The present invention may be more readily understood from the detailed description of an exemplary embodiment presented below considered in conjunction with the attached drawings and in which like reference numerals refer to similar elements and in which.

It is to be understood that the attached drawings are for purposes of illustrating the concepts of the invention and may not be to scale.

DETAILED DESCRIPTION OF THE INVENTION

The present invention relates to a method and system for providing security and privacy guarantees in a publish-subscribe protocol in the presence of honest-but-curious participants. In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
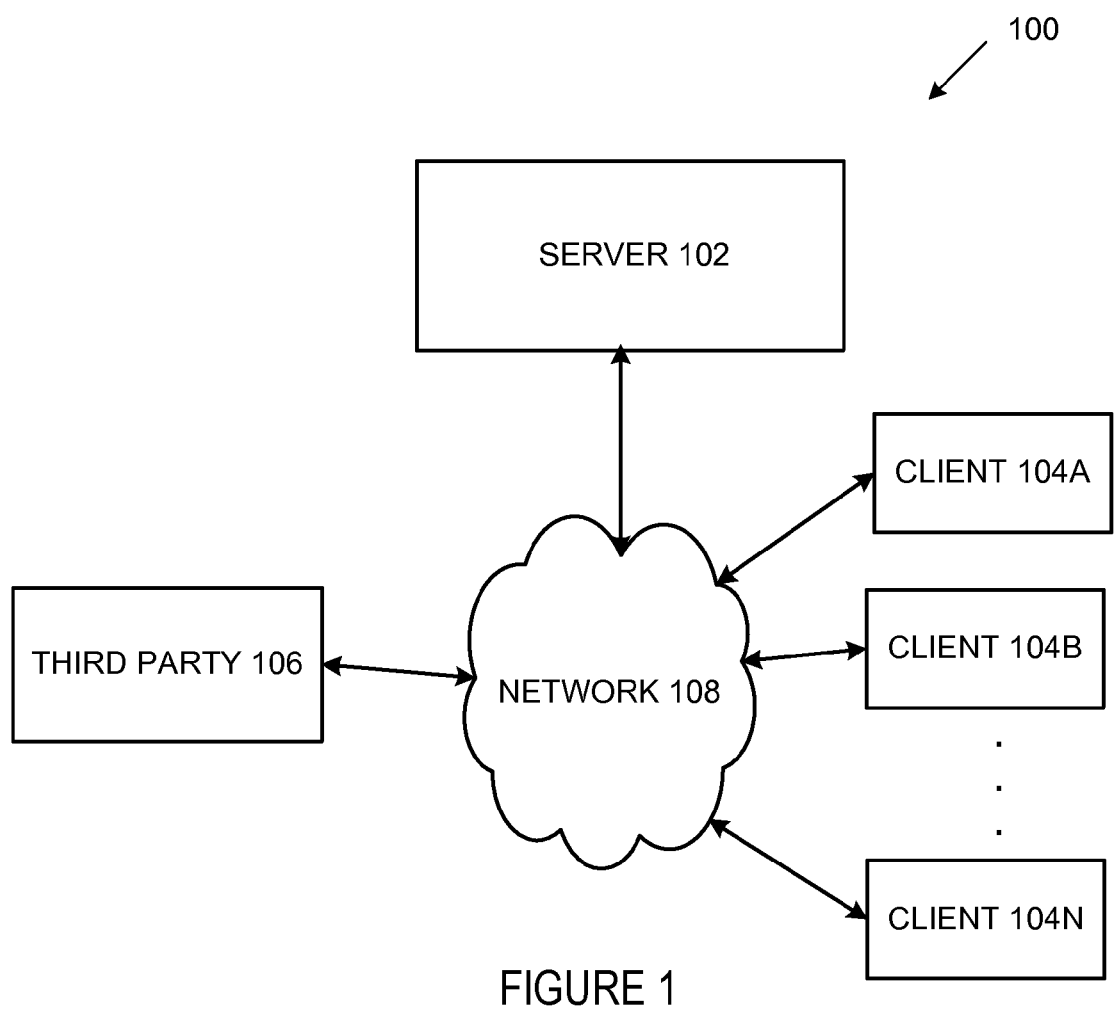
FIG. 1 is a block diagram of a system in which embodiments of the present disclosure may operate.

FIG. 1 is a block diagram of a system 100 in which embodiments of the present disclosure may operate. The system 100 realizes a publish-subscribe protocol with privacy based on the following basic definitions about data, participants, and communication capabilities between the participants. As used herein, items are digital documents in any format to be published. A dictionary is a collection of all topics that each item may or may not relate to, and is known to all participants (e.g., all 128-character strings). Interests are elements from the dictionary associated with a client. Topics are elements from the dictionary associated with an item to be published.

Returning to FIG. 1, the system 100 includes a server 102 configured to process submitted items (and associated topics) and interests of one or more clients 104a-104n to realize the publish-subscribe functionality. In an embodiment, the server 102 functions as a publisher. The one or more clients 104a-104n are configured to submit and update subscriptions based on their interests and configured to receive items that match their current interests. In an embodiment, the clients 104a-104n function as subscribers. A third party 106 is configured to aid the server 102 and the clients 104a-104n in carrying out their functionality. In on embodiment, the third party may be a computing system comprising one or more servers. In one example, the third party 106 may be a cloud server in a cloud computing environment. The server 102, the clients 104a-104n, and the third party 106 may be interconnected by a network 108 (e.g., the Internet). In one example, the network 108 may be assumed to encounter no packet loss or temporarily disconnected participants 102, 104a-104n, 106.

In one embodiment, the system 100 is configured to implement a publish-subscribe protocol by employing phases of operation comprising setup, subscription, publication, and optionally, item deletion. During the setup phase, the server 102, the clients 104a-104n, and the third party 106 may exchange messages to initialize their data structures and/or cryptographic keys. During the subscription phase, the clients 104a-104n may update (add/delete) their interests with the server 102 or the third party 106. During the publication phase, after receiving a new item (e.g., a data item) and associated topics from the clients 104a-104n, the server 102 may distribute the item to the clients 104a-104n based on the topics of the item and the interests of the clients 104a-104n, possibly in collaboration with the third party 106. Publication protocols may follow at least one of two modes: push mode and/or pull mode. In push mode, after an item is submitted, the item is processed by the server 102 and the third party 106 and transmitted one or more of the clients 104a-104n. In pull mode, at any given time, a client (e.g., 104a) may query the server 102 or the third party 106 for any (not previously retrieved) item whose topics match the interests of the client (e.g., 104a). In the item delete phase, the server 102 (and possibly the third party 106 may delete items (e.g., for storage efficiency purposes).

A person skilled in the art would appreciate that the (data) item input to the server 102 may originate from any number and types of sources. For example, the (data) item may originate from the publisher/server 102. In another example, the publisher may receive the next data item from any other party that asks the publisher to publish a data item. In another example, the publisher may receive the next (data) item from an independent information source.

Figure 2:
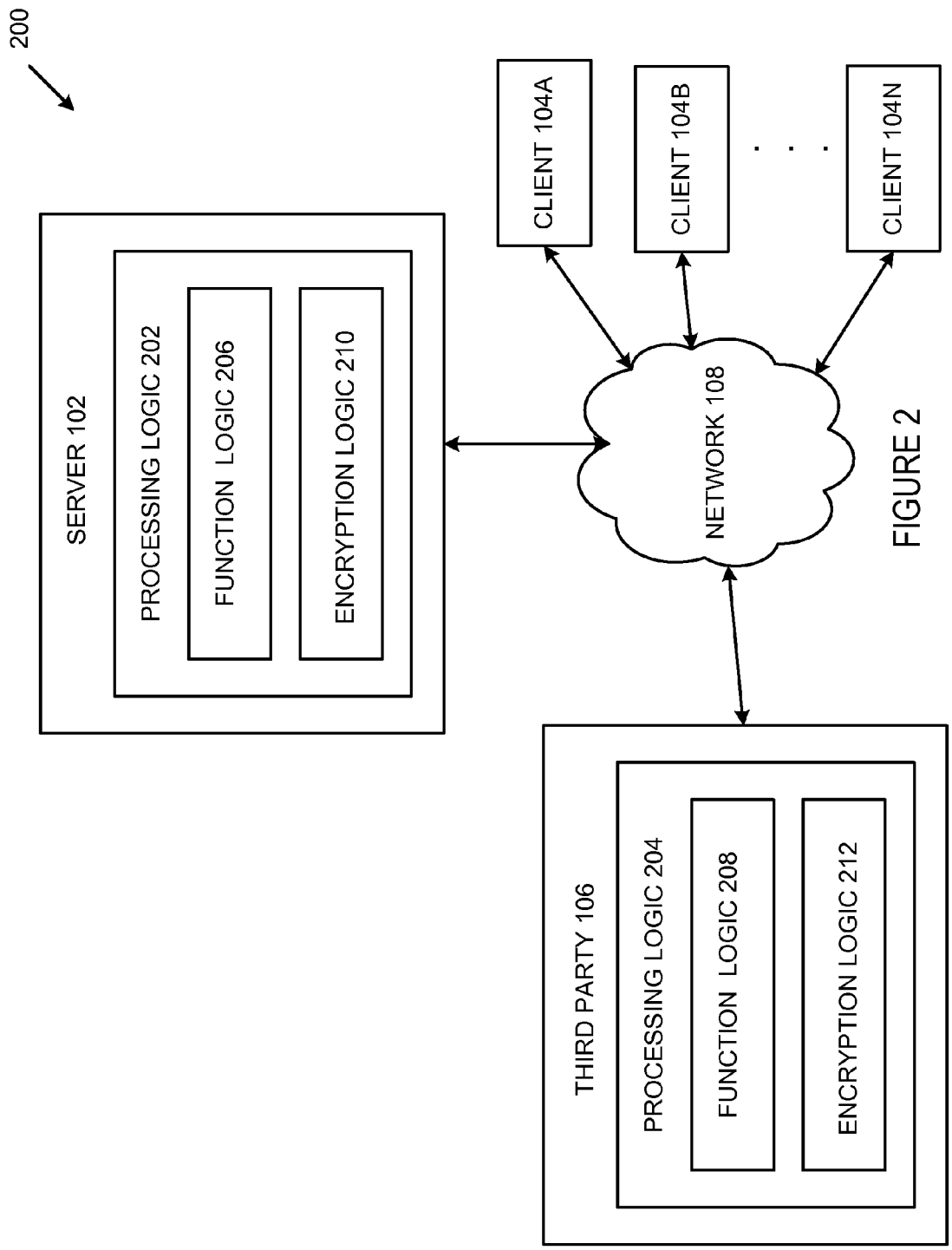
FIG. 2 is a block diagram of a software architecture in which embodiments of the present disclosure may operate.

FIG. 2 is a block diagram of a software architecture 200 in which embodiments of the present disclosure may operate. Referring now to FIGS. 1 and 2, each of the server 102 and the third party 106 are configured to implement corresponding processing logic 202, 204, each of which implements corresponding function application logic 206, 208, respectively. The function logic 206, 208 are configured to implement an arbitrary pseudo-random function F. In one example, the pseudo-random function may be implemented using a block cipher such as AES (Advanced Encryption Standard) or a keyed cryptographic hash function such as HMAC (hash-based message authentication code). Processing logic 202, 204 are further configured to implement encryption logic 210, 212 for implementing an arbitrary symmetric encryption scheme (E, D), where E is an encryption algorithm and D is a decryption algorithm. In one example, the symmetric encryption scheme (E, D) may be implemented using a block cipher such as AES (Advanced Encryption Standard) in a mode of operation such as CBC (cipher-block chaining).

In one embodiment, the clients 104a-104n are configured to share a symmetric key with the server 102 and a different symmetric key with the third party 106. These keys are used as input to the pseudo-random function F to compute a cryptographic pseudonym for interests of a client (e.g., 104a) in a way that neither the server 102 nor the third party 106 can learn any information about an interest from its pseudonym. In the subscription phase, pseudonyms are computed by two sequential applications of F in a way that during the publication phase, the third party 106 can compute the topic pseudonyms of items and directly check for equality between interest pseudonyms of the clients 104a-104n and topic pseudonyms of the items and accordingly the server 102 may publish items without revealing interests to any party or receiving clients 104a-104n.

Figure 3:
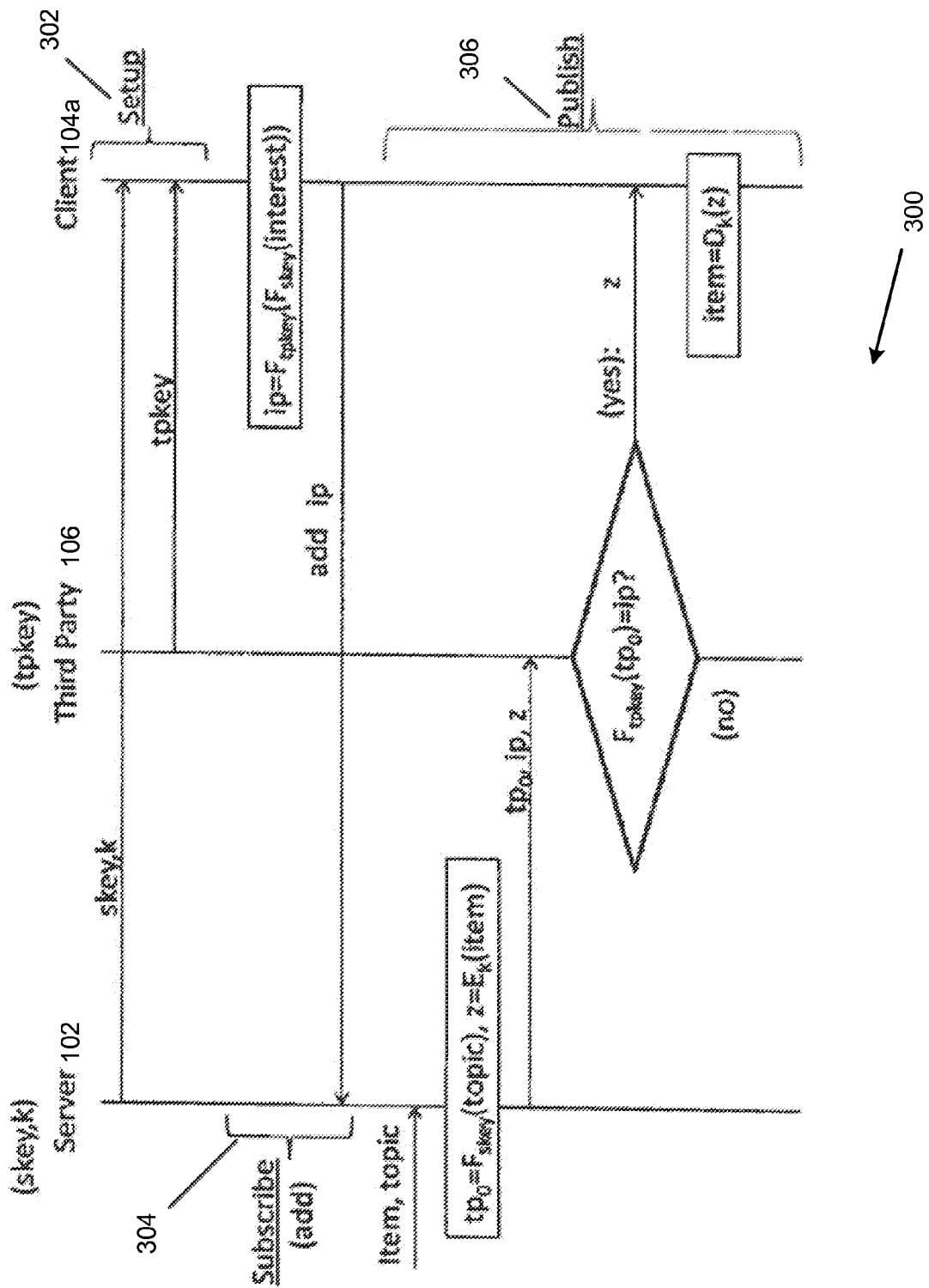
FIG. 3 is a message sequence diagram illustrating messages exchanged between a client, the server, and the third party for implementing one embodiment of a publish-subscribe protocol with privacy.

FIG. 3 is a message sequence diagram 300 illustrating messages exchanged between a client (e.g., 104a), the server 102, and the third party 106 for implementing one embodiment of a publish-subscribe protocol with privacy. For simplicity, one interest and one topic are assumed. In one example, the protocol may be implemented with point-to-point secure communication such as SSL/TLS (transport layer security).

During a setup phase 302, the server 102 and the third party 106 may each be configured to transmit symmetric keys skey and tpkey to the client 104a for use in computing a pseudorandom function F by the client 104a. The server 102 is also configured to transmit a symmetric key, k, for use in an encryption scheme to the client 104a. The keys, skey, tpkey, and k may be obtained and shared by all of the clients 104a-104n.

During a subscription phase 304, a client (e.g., 104a) may be configured to add interests and delete other interests. The client (e.g., 104a) may be configured to compute pseudonyms for the interests to be added as ip=F(tpkey, $ip_0$), where $ip_0$=F (skey, "interest name from dictionary"), and transmits these interest pseudonyms to the server 102 with an "add" label. Optionally, the client (e.g., 104a) may be configured to retrieve from storage (not shown) pseudonyms associated with interests to be deleted and transmits these to the server with a "delete" label. When receiving the request of the client (e.g., 104a), the server 102 may be configured to add or delete the received interest pseudonyms from the subscriptions of the client (e.g., 104a).

During a publish phase 306, when operation of the system 100 is in a pull mode, the following steps (described in of FIGS. 4 and 5 described below), may be performed for each client 104a-104n requesting a pull; in the push mode, the following steps (described in of FIGS. 4 and 5 described below) may be performed for each client 104a-104n. The server 102, after receiving an item with associated topics, is configured to compute and transmit to the third party a value tp0=F(skey, "topic name from dictionary") for each of the item topics, together with a symmetric encryption z of the item based on key k. The server 102 is configured to transmit all of the current interest pseudonyms of the client (e.g., 104a) and all of the topics to the third party 106, which computes each topic pseudonym as tp=F(tpkey, tp0). The third party 106 is configured to determine whether there exists a topic pseudonym tp that is equal to one of the interest pseudonym ip of the client 104a. If yes, the third party 106 is configured to transmit z to the client 104a. The client 104a may recover the item by decrypting z using key k.

Figure 4:
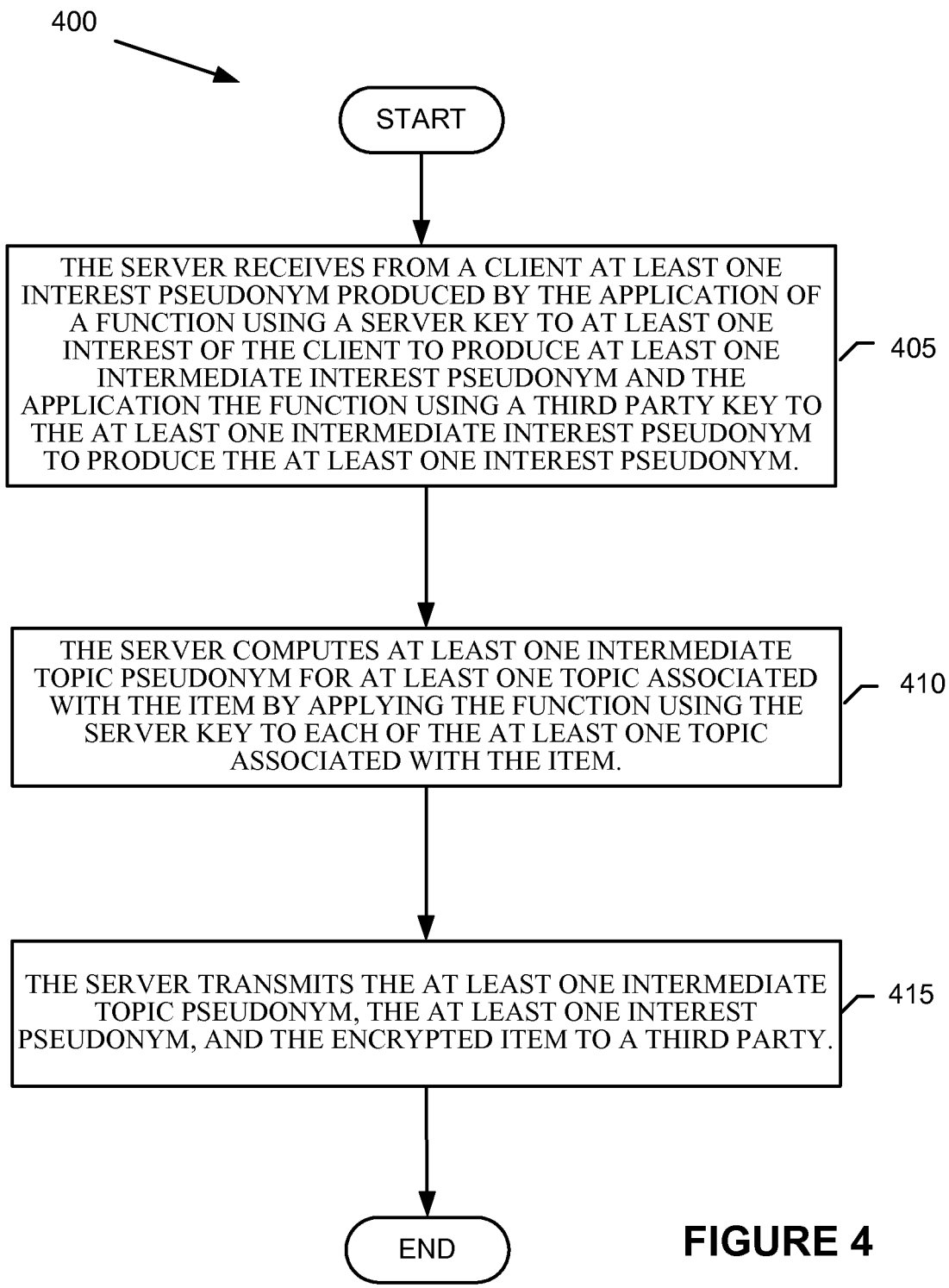
FIG. 4 is a process flow diagram illustrating of one embodiment of a method for providing privacy in a publish-subscribe protocol from the point of view of the server.

FIG. 4 is a process flow diagram illustrating of one embodiment of a method 400 for providing privacy in a publish-subscribe protocol from the point of view of the server 102. Method 400 may be performed by the processing logic 202 of the server 102 (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 400 is performed by the function logic 206 and the encryption logic 210 of the processing logic 202 of the server 102 of FIG. 2.

In one embodiment, method 400 begins when, at block 405, the server 102 receives from a client (e.g. 104a) at least one interest pseudonym produced by the application of a function using a server key to at least one interest of the client to produce at least one intermediate interest pseudonym and the application the function using a third party key to the at least one intermediate interest pseudonym to produce the at least one interest pseudonym. Prior to the receiving the at least one interest pseudonym, during a setup phase, the server 102 may receive an item (e.g., a data item) with associated topics.

In an example, during the setup phase, the server 102 may further receive from the client 104a an indication to add the at least one interest pseudonym to at least one subscription of the client 104a. In an example, during the setup phase, the server 102 may further receive from the client 104a an indication to delete the at least one interest pseudonym from at least one subscription of the client 104a. In response, the server 102 may disassociate the at least one interest pseudonym with the at least one subscription of the client 104a. The server 102a may also receive from the client 104a an interest pseudonym for at least one other interest of the client 104a that is not to be deleted when receiving the indication from the client 104a to delete the at least one interest pseudonym from the at least one subscription of the client 104a. The interest pseudonym for at least one other interest of the client 104a may differ from an initial interest pseudonym for the at least one other interest received by the server 102 from the client 104a.

At block 410, the server 102 computes at least one intermediate topic pseudonym for at least one topic associated with the item by applying the function using the server key to each of the at least one topic associated with the item. The function may be a pseudo-random function. The pseudo-random function may be implemented using a block cipher or a keyed cryptographic hash function. The server may employ a point-to-point secure communication protocol with the client 104a and the third party 106.

At block 415, the server 102 transmits the at least one intermediate topic pseudonym, the at least one interest pseudonym, and the encrypted item to a third party 106. In response, the third party 106 may apply the function using the third party key to the at least one intermediate topic pseudonym to produce at least one topic pseudonym associated with the item. The third party 106 is further configured to determine whether one of the at least one topic pseudonym is equal to one of the at least one interest pseudonym. The third party 106 is further configured to transmit the encrypted item to the client (e.g., 104a) when one of the at least one topic pseudonym is equal to one of the at least one interest pseudonym of the client.

During a setup phase, the server 102 is configured to transmit a private key of a symmetric encryption key pair to the client 104a for decrypting the encrypted item. During the publication phase, the encrypted item may be decrypted by the client (e.g., 104a) using the private key of the symmetric encryption key pair. During the setup phase, the server key and decryption key are shared by client (e.g., 104a) and the server 102, but not by the third party 106. In an example, the server key, the third party key, and the decryption key may differ from each other.

In an example, the applying, encrypting and transmitting may be performed for each of a plurality of clients 104a-104n requesting a pull when the server 102 is in a pull mode. In an example, the applying, encrypting and transmitting may be performed for each of a plurality of clients 104a-104n when the server 102 is in a push mode.

Figure 5:
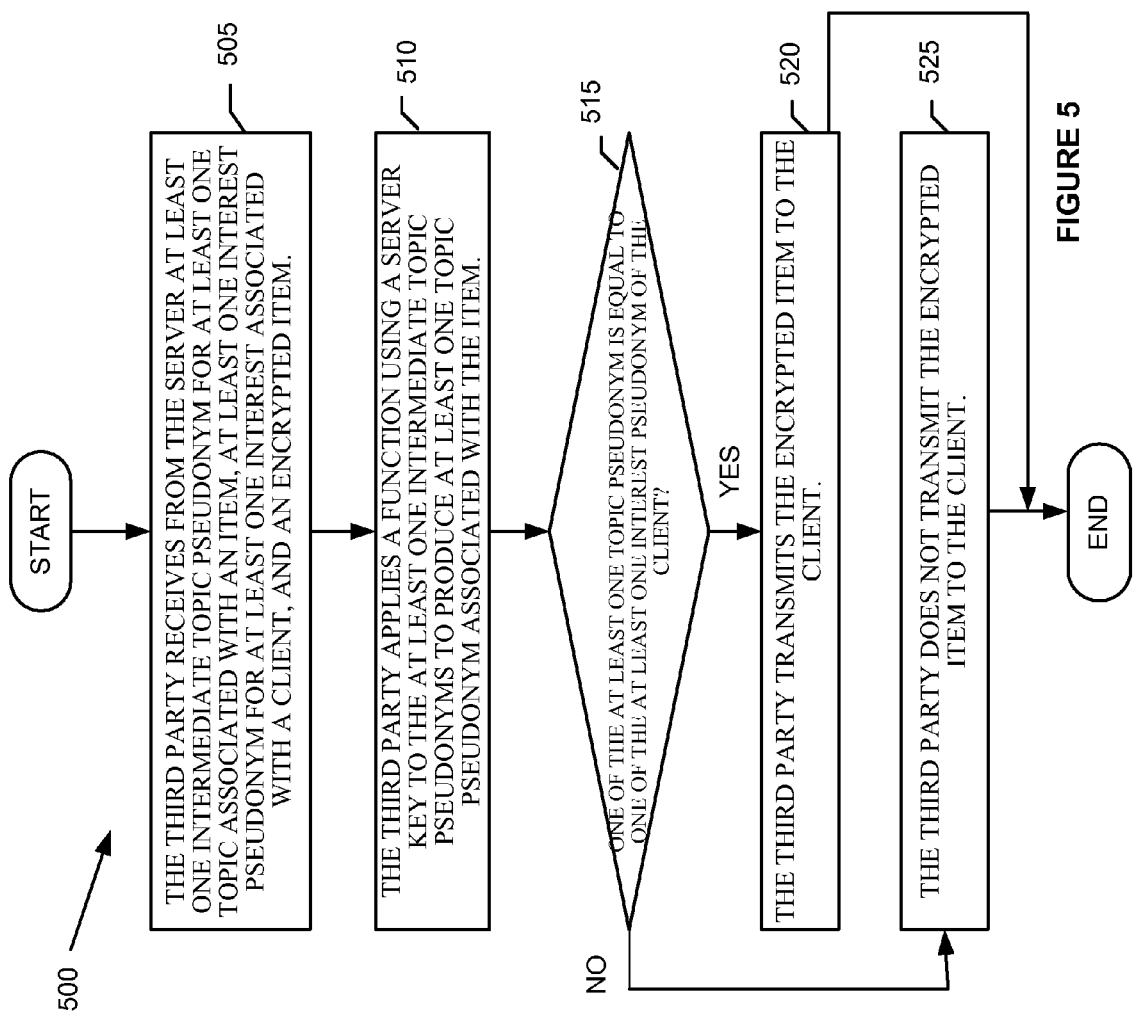
FIG. 5 is a process flow diagram illustrating of one embodiment of a method for providing privacy in a publish-subscribe protocol from the point of view of the third party.

FIG. 5 is a process flow diagram illustrating of one embodiment of a method 500 for providing privacy in a publish-subscribe protocol from the point of view of the third party 106. Method 500 may be performed by the processing logic 204 of the third party 106 (e.g., in computer system 600 of FIG. 6) that may comprise hardware (e.g., circuitry, dedicated logic, programmable logic, microcode, etc.), software (such as instructions run on a processing device), firmware, or a combination thereof. In one embodiment, method 500 is performed by the function logic 218 and the encryption logic 212 the processing logic 204 of the third party 106 of FIG. 2.

In one embodiment, method 500 begins when, at block 505, the third party 106 receives from the server 102 at least one intermediate topic pseudonym for at least one topic associated with an item, at least one interest pseudonym for at least one interest associated with a client (e.g., 104a), and an encrypted item. At block 510, the third party 106 applies a function using a server key to the at least one intermediate topic pseudonyms to produce at least one topic pseudonym associated with the item. At block 515, the third party 106 determines whether one of the at least one topic pseudonym is equal to one of the at least one interest pseudonym of the client. If, at block 515, when the at least one topic pseudonym is equal to one of the at least one interest pseudonym of the client, then at block 520, the third party 106 transmits the encrypted item to the client 104a. Otherwise, at block 525, the third party 106 does not transmit the encrypted item to the client 104a. During the publication phase, the encrypted item may be decrypted by the client (e.g., 104a) using the private key of a symmetric encryption key pair.

Embodiments of the present disclosure have many advantages over prior art publish-subscribe privacy protection methods. The server 102 can store interests (subscriptions) of many clients 104a-104n, add and delete subscriptions dynamically with no need to reprocess all items, and periodically delete items to reclaim space without any participant learning identity or content of deleted items after they have been deleted. Each client 104a-104n receives from the third party 106 all items that match its subscriptions as the equality between interest and topic pseudonyms that can be checked even without the server's private key based on messages received from the server 102. The server 102 learns no information about interests of any client 104a-104n as interest pseudonyms are indistinguishable from random strings because of the properties of the function F. Honest but curious and colluding (but not malicious) clients do not learn anything about other clients' subscriptions since they are not involved in and cannot monitor communication exchanged by other clients. Unpublished items are not revealed to any participant as the third party 106 does not send an item to a client (e.g., 104a) unless a client's interest matches an item's topics. The server 102 does not learn whether any individual item was published or not since only the third party 106 learns if any client 104a-104n is interested in a given item. Publishing each item in the pull mode requires 2 block cipher applications per topic, 1 item symmetric encryption and 1 encrypted item decryption. In the push mode, the number of block cipher applications (with respect to item encryption/decryptions) is multiplied by the number of all clients (with respect to all interested clients).

Figure 6:
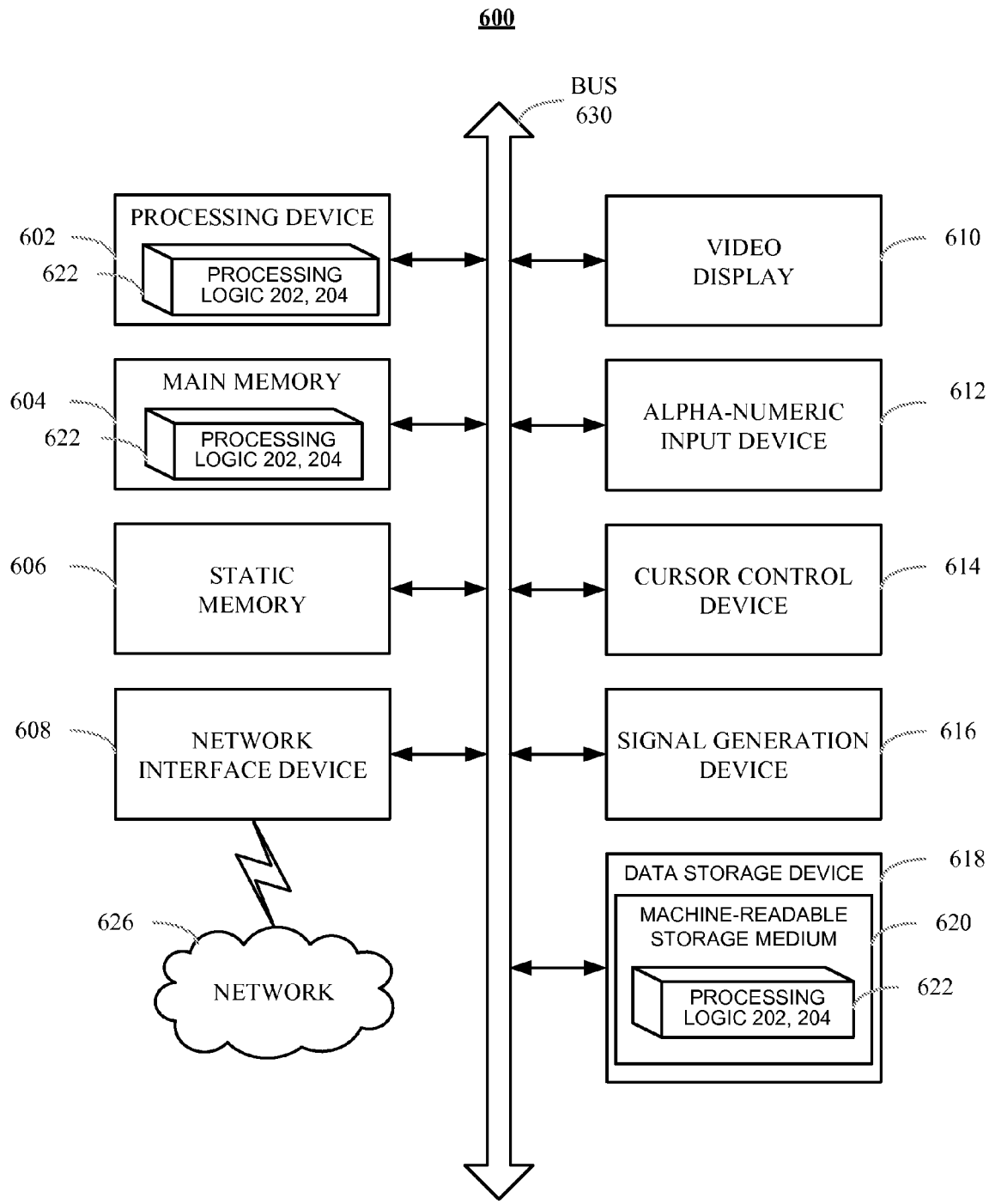
FIG. 6 illustrates a diagrammatic representation of a machine in the example form of a computer system within which a set of instructions, for causing the machine to perform any one or more of the methodologies discussed herein, may be executed.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute processing logic 202, 204 for performing the operations and steps discussed herein.

Computer system 600 may further include a network interface device 608. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

Data storage device 618 may include a machine-readable storage medium (or more specifically a computer-readable storage medium) 620 having one or more sets of instructions (i.e., the processing logic 202, 204) embodying any one or more of the methodologies of functions described herein. The processing logic 202, 204 may also reside, completely or at least partially, within main memory 604 and/or within processing device 602 during execution thereof by computer system 600; main memory 604 and processing device 602 also constituting machine-readable storage media. The processing logic 202, 204 may further be transmitted or received over a network 626 via network interface device 608.

Machine-readable storage medium 620 may also be used to store processing logic 202, 204 persistently. While machine-readable storage medium 620 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method for providing privacy in a publish-subscribe protocol, comprising the steps of:
receiving, by a server from a client, at least one interest pseudonym, wherein the at least one interest pseudonym is produced by applying a function using a server key to at least one interest of the client to produce at least one intermediate interest pseudonym and applying the function using a third party key to the at least one intermediate interest pseudonym to produce the at least one interest pseudonym, wherein the server key is shared between the server and the client and the third party key is shared between the client and a third party, and wherein the server key and the third party key differ from each other;
encrypting, by the server, an item;
computing, by the server, at least one intermediate topic pseudonym for at least one topic associated with the item by applying the function using the server key to each of the at least one topic associated with the item; and
transmitting, by the server, the at least one intermediate topic pseudonym, the at least one interest pseudonym, and the encrypted item to the third party.

2. The method of claim 1, further comprising:
wherein the third party is configured to apply the function using the third party key to the at least one intermediate topic pseudonym to produce at least one topic pseudonym associated with the item;
wherein the third party is configured to determine whether one of the at least one topic pseudonym is equal to one of the at least one interest pseudonym; and
wherein the third party is configured to transmit the encrypted item to the client when one of the at least one topic pseudonym is equal to one of the at least one interest pseudonym of the client.

3. The method of claim 1, wherein the encrypted item is decryptable by the client.

4. The method of claim 1, further comprising transmitting, by the server to the client, a decrypting key to the client for decrypting the encrypted item.

5. The method of claim 4, wherein the decryption key is shared by the client and the server, but not by the third party.

6. The method of claim 4, wherein the decryption key differs from the server key.

7. The method of claim 4, wherein the server key, the third party key, and the decryption key are symmetric keys.

8. The method of claim 1, further comprising receiving, by the server from the client, an indication to add the at least one interest pseudonym to at least one subscription of the client.

9. The method of claim 1, further comprising receiving, by the server from the client, an indication to delete the at least one interest pseudonym from at least one subscription of the client.

10. The method of claim 9, further comprising disassociating, by the server, the at least one interest pseudonym with the at least one subscription of the client.

11. The method of claim 9, further comprising, receiving, by the server from the client, an interest pseudonym for at least one other interest of the client that is not to be deleted when receiving the indication from the client to delete the at least one interest pseudonym from the at least one subscription of the client.

12. The method of claim 11, wherein the interest pseudonym for at least one other interest of the client differs from an initial interest pseudonym for the at least one other interest received by the server from the client.

13. The method of claim 1, wherein the function is a pseudo-random function.

14. The method of claim 13, wherein the pseudo-random function is implemented using a block cipher or a keyed cryptographic hash function.

15. The method of claim 1, wherein the server employs a point-to-point secure communication protocol with the client and the third party.

16. The method of claim 1, wherein the applying, encrypting and transmitting are performed for each of a plurality of clients requesting a pull when the server is in a pull mode.

17. The method of claim 1, wherein the applying, encrypting and transmitting are performed for each of a plurality of clients when the server is in a push mode.

18. The method of claim 1, further comprising receiving, by the server, the item with associated topics.

19. A computer-implemented method for providing privacy in a publish-subscribe protocol, comprising the steps of:
receiving, by a third party from a server, at least one intermediate topic pseudonym for at least one topic associated with an item, wherein the at least one intermediate topic pseudonym was computed by the server by applying a function using a server key to each of the at least one topic associated with the item, wherein the third party cannot access the server key;
receiving, by the third party from the server, at least one interest pseudonym for at least one interest associated with a client, wherein the at least one interest pseudonym was produced by the client by applying a function using the server key to at least one interest of the client to produce at least one intermediate interest pseudonym and applying the function using a third party key to the at least one intermediate interest pseudonym to produce the at least one interest pseudonym;
receiving, by the third party from the server, an encrypted item;
applying, by the third party, a function using the third party key to the at least one intermediate topic pseudonym to produce at least one topic pseudonym associated with the item;
determining, by the third party, whether one of the at least one topic pseudonym is equal to one of the at least one interest pseudonym; and
transmitting, by the third party, the encrypted item to the client when one of the at least one topic pseudonym is equal to one of the at least one interest pseudonym of the client.

20. The method of claim 19, wherein the encrypted item is decryptable by the client.

21. A computer system, comprising:
a memory; and
a processor in communications with the memory, wherein the computer system is configured to perform a method, the method comprising:
receiving, from a client, at least one interest pseudonym, wherein the at least one interest pseudonym is produced by applying a function using a server key to at least one interest of the client to produce at least one intermediate interest pseudonym and applying the function using a third party key to the at least one intermediate interest pseudonym to produce the at least one interest pseudonym, wherein the server key is shared between the server and the client and the third party key is shared between the client and a third party, and wherein the server key and the third party key differ from each other;
encrypting an item;
computing at least one intermediate topic pseudonym for at least one topic associated with the item by applying the function using the server key to each of the at least one topic associated with the item; and
transmitting the at least one intermediate topic pseudonym, the at least one interest pseudonym, and the encrypted item to a third party.

22. The system of claim 21,
wherein the third party is configured to apply the function using the third party key to the at least one intermediate topic pseudonym to produce at least one topic pseudonym associated with the item;
wherein the third party is configured to determine whether one of the at least one topic pseudonym is equal to one of the at least one interest pseudonym; and
wherein the third party is configured to transmit the encrypted item to the client when one of the at least one topic pseudonym is equal to one of the at least one interest pseudonym.

23. The system of claim 21, wherein the encrypted item is decryptable by the client.

* * * * *